United States Patent [19]

Laird

[11] Patent Number: 5,062,134
[45] Date of Patent: Oct. 29, 1991

[54] TIMER FOR CONTROLLING TELEPHONE USAGE

[76] Inventor: James M. Laird, 2509 N. Campbell, No. 101, Tucson, Ariz. 85719

[21] Appl. No.: 583,470

[22] Filed: Sep. 17, 1990

[51] Int. Cl.⁵ .................... H04M 1/21; H04M 15/02
[52] U.S. Cl. .................................. 379/131; 379/140; 379/190; 379/199; 368/4; 368/13
[58] Field of Search ............... 379/131, 110, 140, 190, 379/192, 199; 368/4, 13, 109

[56] References Cited

U.S. PATENT DOCUMENTS

| | | | |
|---|---|---|---|
| 3,508,392 | 4/1970 | Temps, Jr. | 58/145 |
| 3,581,029 | 5/1971 | Noiles | 200/38 |
| 3,833,779 | 9/1974 | Leone | 200/33 |
| 3,879,332 | 4/1975 | Leone | 200/33 |
| 3,925,629 | 12/1975 | Albinger, Jr. | 200/38 |
| 3,997,742 | 12/1976 | Marquis | 200/38 |
| 4,079,201 | 3/1978 | Scott et al. | 379/131 |
| 4,297,546 | 10/1981 | Koch | 200/38 |
| 4,335,279 | 6/1982 | Colombo et al. | 368/4 X |
| 4,771,452 | 9/1988 | Carlson | 379/140 |

Primary Examiner—Stafford D. Schreyer
Attorney, Agent, or Firm—Antonio R. Durando; Harry M. Weiss

[57] ABSTRACT

A timer for automatically controlling the cumulative service time of a telephone consisting of a box mounted over and plugged into a standard wall telephone outlet. The box contains an exterior receptacle for connection with the telephone cord. The interior of the box is secured by a locked cover that prevents access to the controls as well as to the mounting screws that fasten the unit to the outlet box. The desired total amount of time of phone use permitted during each 24 hour period is selected by setting appropriate control switches and it remains unchanged until a new selection is made. At the expiration of the selected cumulative service time, the timer alerts the user of the impending disconnection by a tone signal and automatically disconnects the phone soon thereafter. The device is powered by a battery backed utility 110 VAC source and it resets itself automatically every 24 hours, so that no periodic adjustments or calibrations are required.

8 Claims, 4 Drawing Sheets

TIMER FOR CONTROLLING TELEPHONE USAGE

BACKGROUND OF THE INVENTION

1. Field of the Invention

This invention pertains to the general field of timers and controllers to regulate the usage of electrical appliances and equipment. In particular, it provides a new device to limit the amount of service time allowed for the use of a telephone.

2. Description of the Prior Art

The idea of affecting the availability of power to electrical appliances and other equipment in order to control their use has been implemented in a variety of ways by mechanical and electrical means. A common feature of these devices is the presence of a power control switch that is accessible only through a lock or other protective hardware.

For example, U.S. Pat. No. 3,581,029 to Noiles (1971) describes a television control for regulating the cumulative viewing time. The device features an internal outlet for receiving and securing the television's plug and an external plug for connection to any power source. A predetermined total length of time is made available to the viewer, who controls the utilization of that time with an on/off switch on the exterior of the device. An internal mechanical accumulator keeps track of the time used and switches off the unit when the total allowed time has expired. The instrument also resets itself every 24 hours.

U.S. Pat. No. 3,833,779 to Leone (1974) shows another television timer, which provides essentially the same function of the invention described by Noiles, but without the accumulator and the automatic resetting features. Like that invention, this apparatus can be used with any appliance requiring electrical power and is not limited to television sets.

In U.S. Pat. No. 3,879,332 (1975), Leone teaches another use of his prior invention in an application specific to television sets. The device is incorporated into the set to control the TV circuitry directly, rather than the power to it, so that the television remains plugged in the normal power outlet. As previously done in the art, the mechanism can also be combined with a coin slot to permit the purchase of viewing time.

U.S. Pat. No. 3,925,629 to Albinger (1975) illustrates a time switch for controlling the delivery of power from an electrical outlet according to a predetermined on/off schedule. The device has two automatic modes permitting a choice between repeating the same schedule every day and periodically alternating between different ones. It also allows manual control as a regular switch.

The invention is designed for use with any appliance requiring electrical power from a regular outlet, such as lamps and radios, but its control is not secured and is accessible to anyone.

In U.S. Pat. No. 3,997,742 (1976), Marquis describes another automatic timer switch wherein the switching mechanism is simplified and the number of parts involved is reduced. This patent is basically the same as Albinger's in function and purpose, and it very specifically shows an alternative mechanism to achieve the same result. Some minor features differentiate the two, such as the presence of a dual outlet instead of a single one, but the operational characteristics of the two are essentially the same.

U.S. Pat. No. 4,297,546 to Koch (1981) discloses yet another type of timing switch, wherein different mechanical parts are employed to achieve the same results. As the inventions of Marquis and Albinger, this switch can be operated automatically, in combination with a timing device incorporated into the apparatus, or manually, like a regular electrical switch.

Finally, U.S. Pat. No. 3,508,392 illustrates an invention for recording the length of outgoing telephone calls from a dial-type receiver. The apparatus does not control in any way the duration of the calls, either individually or cumulatively.

Thus, the prior art does not include an apparatus to control the cumulative time allowed for the use of a telephone. As every parent knows, such a product would be very desirable in order to limit the time spent by children on the phone, especially in view of the now common practice of allowing each child a private phone connected to the household telephone line. This kind of device would be similarly useful to control phone usage by house keepers, and employees in comparable business environments. Therefore, a need exists for an inexpensive and practical device for controlling the total amount of time allowed for telephone usage.

BRIEF SUMMARY OF THE INVENTION

The present invention consists of a telephone line accessory that is mounted on a standard wall telephone outlet. The device is provided with a secured telephone plug that is connected to the wall outlet and with an open outlet for connection with the plug on the telephone mounting cord. Enclosed in the apparatus is a set of switches and logic hardware to implement predetermined choices of total daily service time, and an alarm to indicate its impending expiration.

One objective of this invention is a device that prevents direct access to a telephone line's outlet. This is achieved by providing a locked receptacle for mounting over the outlet box, so that access to the outlet is available only through the receptacle itself.

Another objective of the invention is that it allow the user to control the total amount of service time of a telephone connected to it. Therefore, the apparatus described herein encloses a clock and control switches, accessible only through a locked cover, for selecting the cumulative time of permitted use in any 24 hour period. At the expiration of that time, the line is automatically disconnected and the telephone cannot be used again until the system is reset at the beginning of the next 24 hour period.

Another goal of the invention is the development of a timing apparatus that is independent of the number of phone calls recorded. Accordingly, this timer keeps track of cumulative time of service without regard to any other factor.

Another objective is that the telephone user be given appropriate notice when the service time is about to expire, so that she can bring the conversation to a normal conclusion without abrupt interruption. This is obtained by having an alarm that alerts the user of the impending time expiration by providing a tone in the line approximately 60 seconds prior to suspension.

A further objective of the invention is the ability to apply the same general concept in a variety of designs and physical embodiments to fit the various modes of telephone service delivery. To that end, the apparatus described herein can be used for single as well as double-line systems, and it can be designed to receive power from any source available in a normal household environment, such as 110 volt AC, a standard 9 volt DC battery, or even the telephone line itself.

Yet another objective of this invention is the realization of the above mentioned goals in an economical and commercially viable manner. This is done by utilizing simple components that are either already available in the open market or can be produced at competitive prices.

Various other purposes and advantages of the invention will become clear from its description in the specifications that follow, and from the novel features particularly pointed out in the appended claims. Therefore, to the accomplishment of the objectives described above, this invention consists of the features hereinafter illustrated in the drawings and examples, fully described in the detailed description of the preferred embodiment and particularly pointed out in the claims. However, such drawings and description disclose but one of the various ways in which the invention may be practiced.

DETAILED DESCRIPTION OF THE INVENTION

The heart of this invention lies in the novel application of the concept of service-time control to telephone usage. A similar function has been achieved in prior art, as seen, for example, with the use of televisions in the above referenced patent issued to Noiles, but with considerably more complicated and cumbersome structural parts and never as an accessory to telephone equipment.

In the embodiment described here in detail, the timer of this invention consists of a box mounted over and plugged into a standard wall telephone outlet. In turn, the box contains an exterior receptacle for connection with the telephone cord. The interior of the box is secured by a locked cover that prevents access to the controls as well as to the mounting screws that fasten the unit to the outlet box. The desired total amount of time of phone use permitted during each 24 hour period is selected by setting appropriate control switches and it remains unchanged until a new selection is made. The device is powered by a battery backed utility 110 VAC source and it resets itself automatically every 24 hours, so that no periodic adjustments or calibrations are required.

Figure 1:
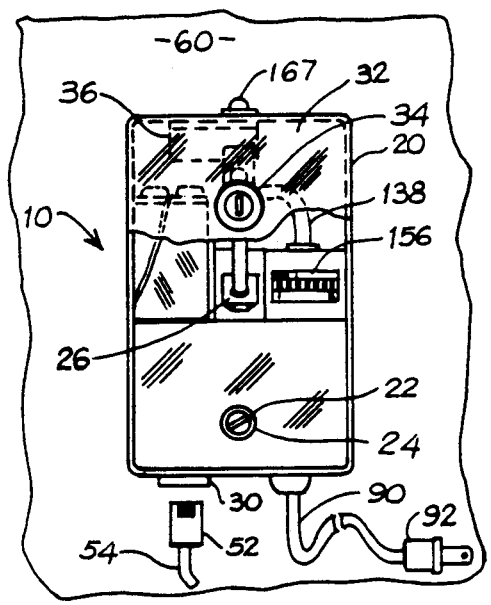
FIG. 1 is an elevational view of the preferred embodiment of the timer according to this invention, wherein the device is packaged in a box, shown with its cover partially cut-out, mounted on a standard wall telephone outlet for connection to the line.
Figure 2:
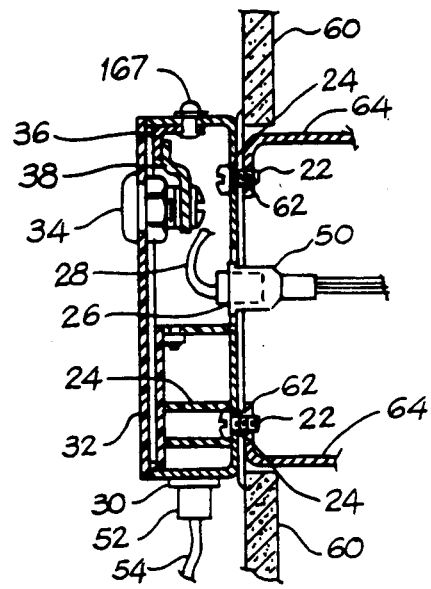
FIG. 2 shows a partially cut-out side view of the box of FIG. 1 after connection with the wall telephone outlet.

Referring to the drawings, wherein like parts are designated throughout with like numerals, FIG. 1 shows a frontal view of the preferred embodiment of the timer 10 according to the invention, as seen with its cover 32 partially cut-out after mounting on a standard wall telephone outlet 50. The timer comprises a box 20 approximately of the size of a standard outlet cover plate and sufficiently deep to house the timer's hardware. As also illustrated in the cut-out side view of FIG. 2, two mounting screws 22 hold the box 20 in place against the standard telephone outlet 50, normally found on a wall 60, through two mounting slots 24 that correspond to the mounting tabs 62 of a standard outlet box 64. A standard telephone plug 26 and cord 28 are available in the interior of the box for connection with the wall outlet 50, thereby linking the timer to the telephone line. The cord 138 is in turn connected, through electronic circuitry described in detail below, to another outlet 30, positioned on the exterior of box 20 for free connection with the standard plug 52 found on all modern telephone mounting cords 54. A power cord 90 and plug 92 are available for connection with a standard 110 VAC power outlet.

A cover 32 for the box 20 is provided to protect the unit and prevent unauthorized access to its interior. The bottom of the cover and box feature teeth and corresponding grooves, respectively, to create a support joint for the cover (not shown in the figures). A latch 38, operable only by the use of a key through a lock 34, is located on the top portion of the cover for cooperative engagement with a catch 36 protruding from the top side in the interior of the box. Thus, the cover 32 and box 20 form a secure housing for the timer and the switches controlling its operation. An exterior light emitting diode (LED) 167 is also provided to signal the interruption of service, as further explained below. While the above described structure represents the preferred embodiment of this invention, it is recognized that its features may be implemented by many alternative structural configurations so long as they give a user the option to secure the access to the telephone outlet through the locked interior of the timer, in whatever form that outlet may be available for use.

Referring now to the electronic components of the timer, it is understood that the schematic shown in FIGS. 3, 4, 5 and 6 illustrate only one of many ways by which one skilled in the art would be able to implement the functions described by this invention. The system comprises nine basic components, consisting of a power supply, a 60 Hertz timing source, a switch for line selection between the two alternative lines commonly wired into residential buildings, an off-hook detector, a 24-hour time clock, a 15-minute time clock, a one-minute time clock, a set of manual programmable control switches, and a tone signal generator. Since only two of the four wires provided at the phone outlet (normally coded in red and green for the primary line, and black and yellow for the secondary line) are used to set up the first phone line in the household (so that the remaining two are readily available for a second line), the timer is designed to be able to control either one of the two sets of lines, but not both simultaneously. This is accomplished by positioning the three-pole two-position switch 120 (shown in FIG. 4) to connect the desired circuit. Note that the timer of this invention could easily be adapted by a similar multi-position switching system to control any one line of a multiple line system.

As would be apparent to one skilled in the art from the schematics shown in the drawings, the basic function of the timer of this invention is to break the contact between one of the wires in the phone loop to interrupt service at the expiration of a predetermined time period (the green wire if the timer is set up to control the primary line; the black wire if the timer is set up for the secondary line). When the contact is broken, the phone is left dead as if it were unplugged from the wall outlet. The actual breaking of the line is accomplished by a relay 130 (normally open when not energized) wired in series with either the green or the black wire, depending upon the setting of switch 120. The relay 130 is driven by the integrated circuit 164 (shown at the output of the one-minute timer in FIG. 5), which consists of a 74HCO2 chip. The relay 130 and the way it breaks the phone connection constitute the most important feature of the timer of this invention. The balance of the electronic portion of the apparatus constitutes a control circuit that turns the relay on and off.

Figure 4:
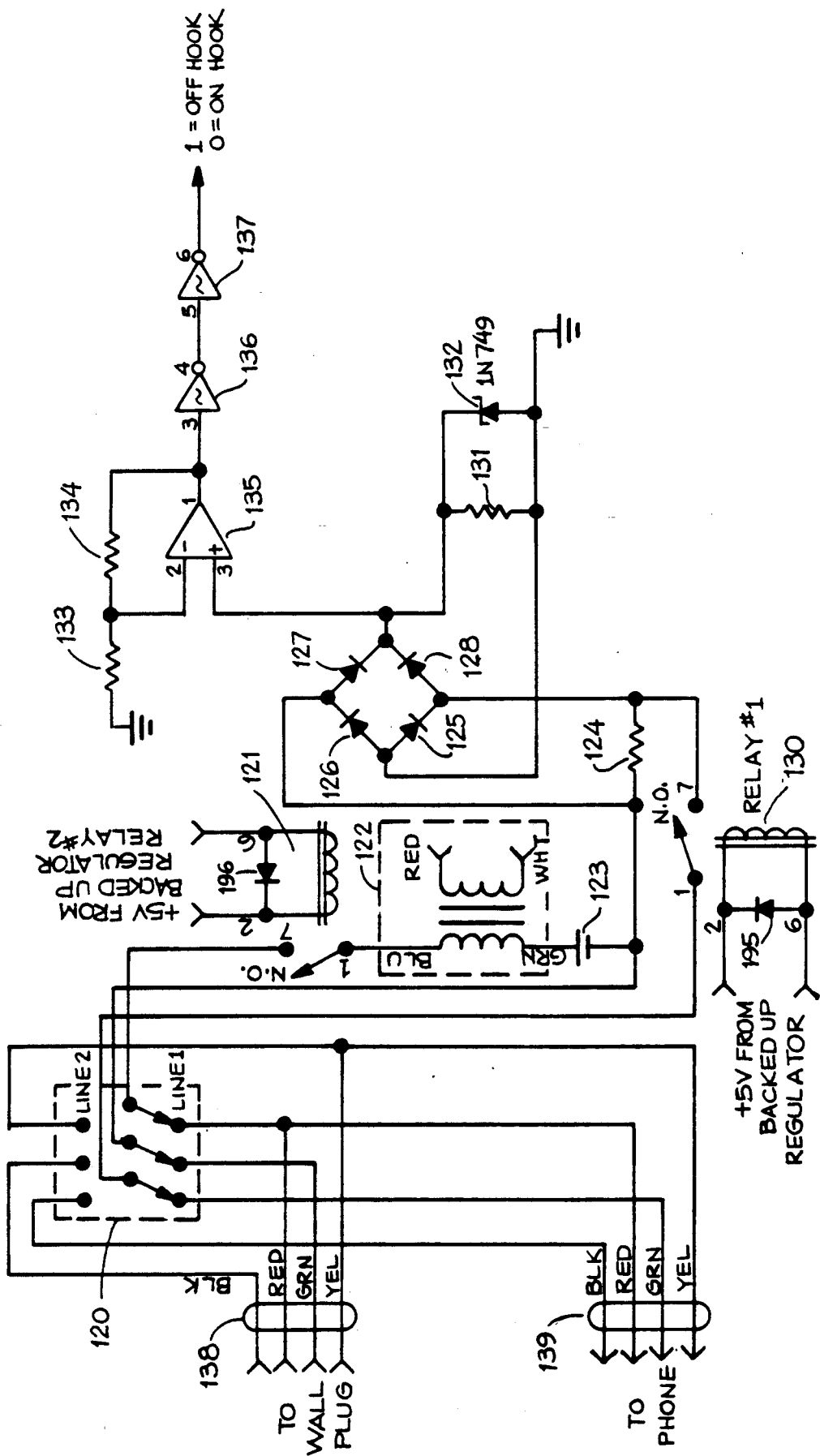
FIG. 4 shows a schematic diagram of one embodiment of the wiring of the telephone connections and off-hook detector of the invention.
Figure 5:
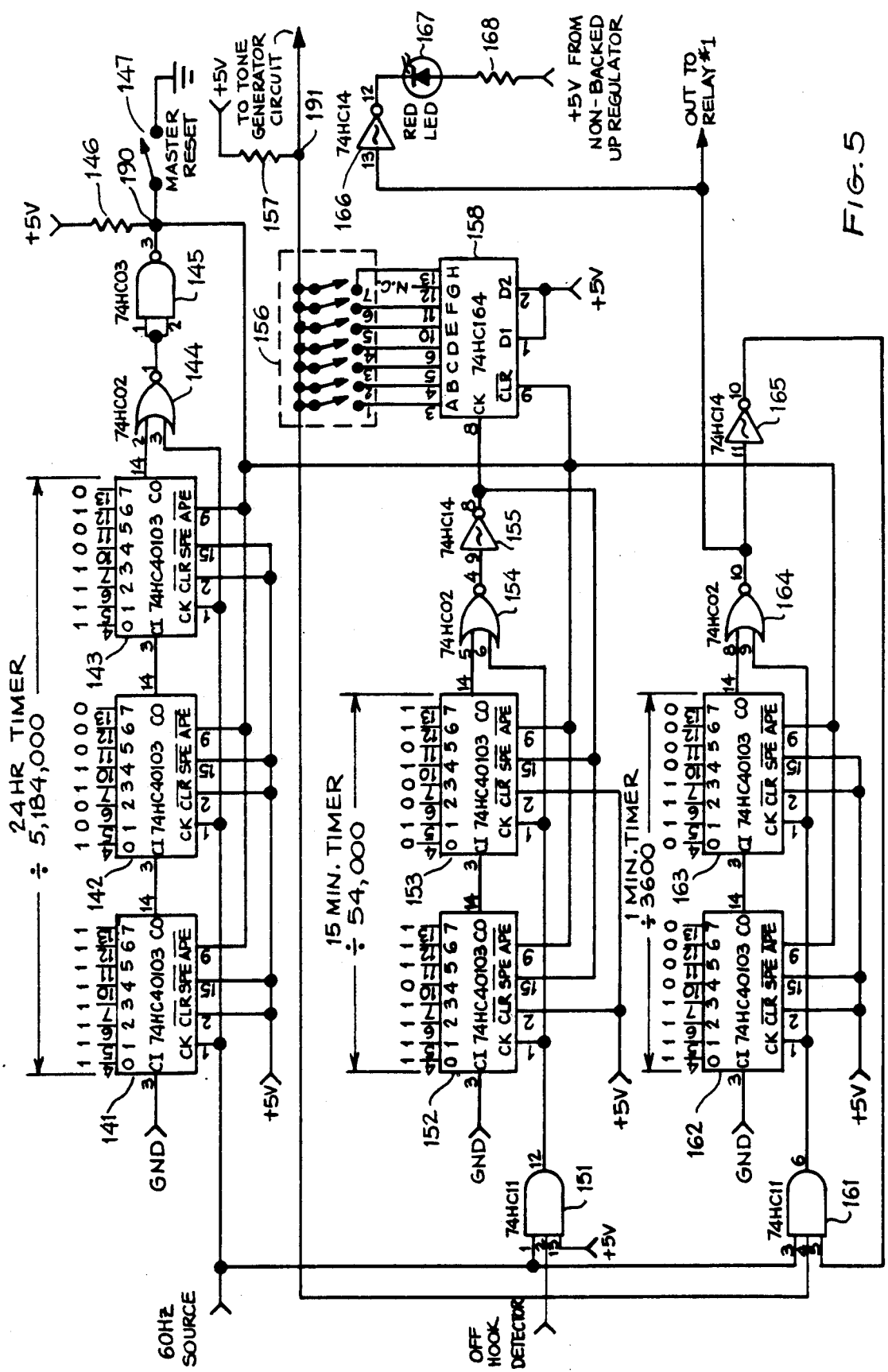
FIG. 5 shows a schematic diagram of one embodiment of the electronic circuitry of the timing clocks and control switches of the invention.
Figure 6:
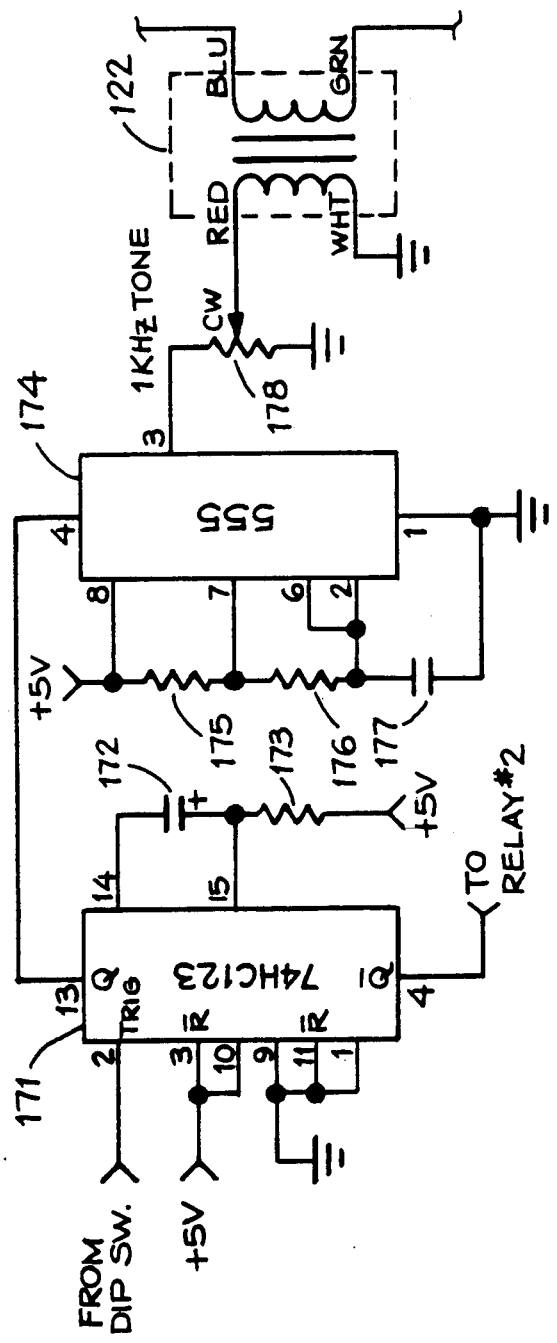
FIG. 6 shows a schematic diagram of one embodiment of the electronic circuitry of the tone generator of the invention.

As illustrated in FIG. 4, when the timer is first plugged into the phone line, the four coded wires from the phone company are connected through the internal plug 26 to four correspondingly coded (black, red, green and yellow) circuitry wires in a multi-conductor cable 138. Similarly, the four circuit wires in multi-conductor cable 139 are connected to the corresponding coded wires in the telephone plug 52 through the outlet 30 mounted on the exterior of the timer's housing.

The selection of the daily cumulative time available for service is accomplished by closing one of the switches in the set 156 (FIG. 5) that allocate the daily time usage. In the particular embodiment shown in FIG. 5, the set 156 consists of seven switches, SW1 through SW7, which permit seven alternative choices of cumulative service time. Another switch in the circuit, referred to as the master reset switch 147 (normally open), is provided to reset the clocks of the apparatus by momentarily grounding their asyncronous-preset-enable (APE) inputs. This presets the three counters (the 24-hour timer, the 15-minute timer, and the one-minute timer) to their starting points, and clears the 74HC164 shift register 158 to all zeros. When the master reset switch 147 is reopened (moments later), the 24-hour timer begins counting down. When it reaches zero, it pulls the master reset switch line low and automatically presets itself and the other timers and clears the shift register 158. The 24-hour timer consists of a 24-bit programmable divide-by-N down-counter comprising three cascaded 74HC40103 chips 141, 142 and 143, whose final carry-output (CO) is connected to a 74HC02 integrated circuit 144, whose output is then inverted by a 74HC03 chip 145. The 15-minute and the one-minute timers consist of 16-bit programmable divide-by-N down-counters comprising two cascaded 74HC40103 chips referred to as 152-153 and 162-163, respectively. These chips, carry-outputs are also connected to 74HCO2 chips 154 and 164, whose outputs are then inverted by 74HC14 chips 155 and 165, respectively. The 2.2 K pull-up resistor 146 serves to hold the voltage at node 190 high until such time as it is pulled low by the master reset switch 147 or the output of the 74HC03 chip 145. As easily recognized by one skilled in the art, the 24-hour timer is programmed to divide by 5,184,000 (that is, the product of the line frequency, 60 Hertz, and the number of seconds in a 24-hour period).

The divisors for the 15 minute and the one minute timers (54,000 and 3,600, respectively) are calculated the same way. Accordingly, they are each set to predetermined numbers and are then decremented to zero at a rate of 60 counts per second when enabled.

Figure 3:
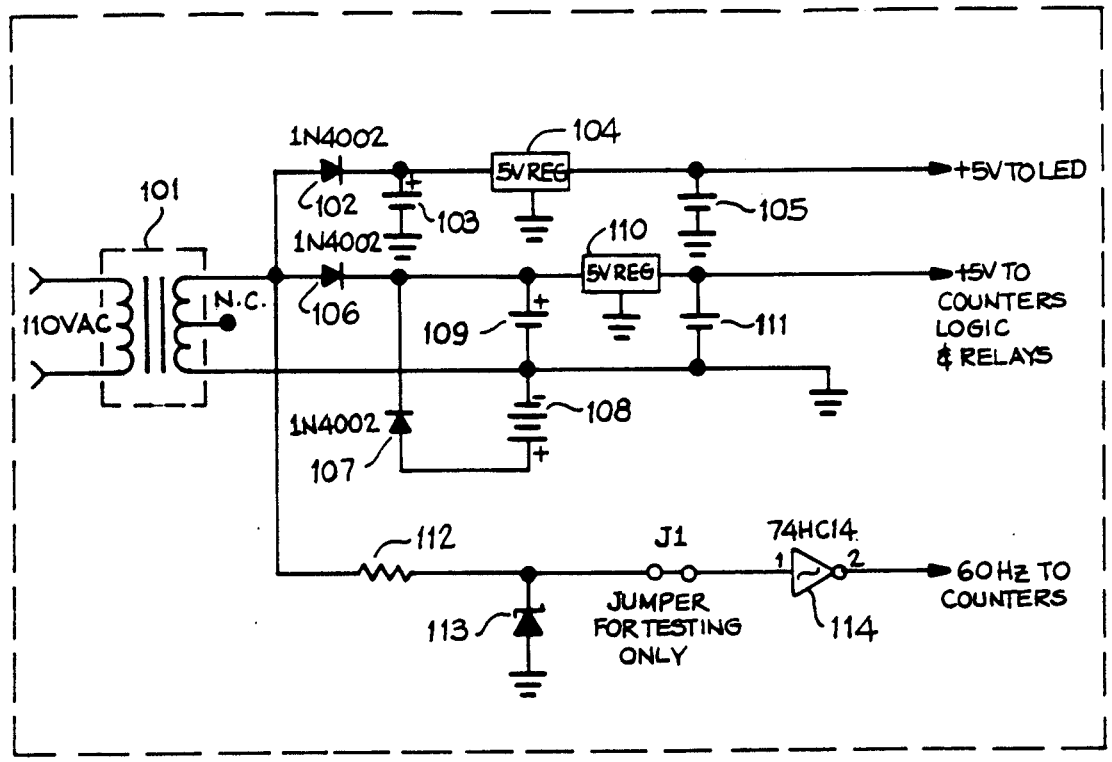
FIG. 3 shows a schematic diagram of one embodiment of the electronic circuitry of the power supply of the invention.

As illustrated in FIG. 3, all of the timers are decremented by a 60 Hz source derived from the highly accurate 110 VAC frequency of the utility line. The voltage is first stepped down by a transformer 101 to 12.6 VAC. Then, a 60 Hz square wave is obtained for timing purposes by feeding the non-grounded side of the 12.6 VAC through a first terminal of a 1 K resistor 112, and connecting its second terminal to the cathode side of a grounded 4.3 V zener diode 113 and to the input of a Schmitt Trigger gate 114 (a 74HC14 chip). Thus, the 12.6 VAC sine wave is reduced into a clipped sine wave (by the resistor and the zener diode) so that it can be fed into a logic device (the 74HC14 chip) for pulse shaping and conditioning. The corresponding output from the Schmitt Trigger gate 114 is a symmetrical square wave with sharp edges and is suitable for use by the logic gates for timing purposes.

Power is supplied to the various logic functions of the system from the same transformer 101 through a rectifying 1N4002 diode 106, the output of which is connected to the nongrounded terminal of a grounded 470 ufd capacitor 109 and to the input of a 5 V regulator 110, whose output is bypassed by a 0.1 ufd capacitor 111. The system is backed up by a 9 V battery 108 connected through a 1N4002 diode 107 to the input of the 5 V regulator 110. A separate regulator 104, similarly connected in series to the output of another rectifying 1N4002 diode 102 and a 470 ufd capacitor 103, is used to energize the LED. A 0.1 ufd bypass capacitor 105 is installed between the output of regulator 104 and ground. This regulator is used to prevent the excessive drainage of the battery in the event of a power failure or of the inadvertent disconnection of the unit from the 110 VAC source. In such event, the LED will not function until power is restored.

During each 24 hour period clocked by the 24-hour timer, the phone can be used for up to the predetermined total amount of time which has been set in fifteen minute increments by the set of switches 156. At the beginning of each cycle, the phone will function because the relay 130 is energized, thereby connecting the phone to the wall outlet wires through either Line 1 or Line 2, depending on the setting of switch 120 (see FIG. 4). When the receiver is first picked up, the cumulative use, 15-minute timer starts to run because the off-hook detector circuit senses that the phone is off the hook and signals the timer to begin counting down. As shown in FIG. 4, the off-hook detector works by sensing a small voltage drop across a 75 ohm resistor 124 that is wired in series with the phone line. When the phone is on the hook, there is no current flowing though the phone line and hence no voltage appears across that resistor. When the receiver is picked up, current flows though the phone line and a small voltage appears across the resistor 124. This voltage is fed through a full wave rectifier (consisting of four 1N4002 diodes 125-128) so that the invention will still work in case the red and green wires are mistakenly reversed somewhere in the line. The signal leaving the full wave rectifier is then amplified about ten times by feeding it into the positive input terminal of operational amplifier 135. A 10 K resistor 131 and a 4.3 V Zener diode 132 are connected in parallel between the positive input of operational amplifier 135 and ground to clamp undesirable voltage spikes. The negative input terminal of operational amplifier 135 is grounded through a 10 K resistor 133 and is connected to the output terminal of the operational amplifier 135 through a 100 K resistor 134. Resistors 133 and 134 serve to set the gain of operational amplifier 135. The output signal of this operational amplifier is thus at logic compatible levels and is fed into a series of two Schmitt Trigger gates 136 and 137 (two because the signal becomes inverted after the first one) and then used by the counters and their associated logic chips. So, when the phone is picked up, an off-hook state results which feeds a logic level 1 to a 74HC11 integrated circuit 151 (FIG. 5) that allows the 60 Hz line frequency to begin decrementing the 15-minute timer. When the phone is hung up, the off-hook state changes to a logic level 0 and the 15-minute timer stops counting down. If the off-hook state lasts more than 15 minutes, the timer rolls over and starts counting down a new 15 minute period. When the timer rolls over, it sends a carry-out pulse through the 74HC02 chip 154 and the 74HC14 chip 155 to the clocking input on the shift register chip 158, and a 1 is clocked into the first position of the shift register. Note that all eight positions on the shift register are cleared to 0 when the master switch reset line is pulled low. Whenever the shift register receives a clock pulse, it clocks another 1 onto the least significant bit of the shift register and moves any other 1's over to the right by one position. Depending on how the set of switches 156 is preset, the amount of time allowed on the phone is determined by the number of rollover clock pulses received by the shift register 158. The total amount available can obviously be varied by changing the number of switches and the length of the 15-minute clock in the circuitry. When the time is up, the user hears a two-second tone on the phone line emitted by the tone generator circuit shown in FIG. 6. At that time, 60 seconds are allowed to bring the conversation to an end before the phone is automatically cut off by the relay 130. This occurs by virtue of the fact that when a 1 is finally clocked over into the shift register position which connects over through a switch (one of seven in this embodiment) to the common rail of the set of switches 156, that logical 1 starts the one-minute timer count down by applying a logic level 1 to the 74HC11 chip 161, which enables the 60 Hz line frequency to begin decrementing the one-minute timer. It also triggers the tone generating circuit, which comprises a 74HC123 chip 171 and a 555 chip 174. The two second duration of the tone is set by the 2 ufd timing capacitor 172 and the 1 Meg timing resistor 173. The two second pulse produced by the 74HC123 chip 171 activates the 1 kHz tone which is produced by the 555 chip 174. The frequency of the 1 kHz tone is determined by the two 4.7 K resistors 175 and 176 and the 0.1 ufd capacitor 177. The amplitude (loudness) of the tone is set by the 10 K variable resistor 178, whose output is fed to the transformer 122. When the tone circuit is triggered, it mixes the two-second 1 kHz tone produced by the 555 chip onto the phone line through the relay 121 (shown in FIG. 4), which connects one side of the phone line to the transformer 122 and, through a 0.1 ufd capacitor 123 and switch 120, to the other side of the telephone line. Normally the relay 121, which connects the transformer 123 to the phone line, is left open and it is only closed long enough to apply the 1 kHz tone for two seconds. Both relays, 130 and 121, have internal diodes, 195 and 196, respectively, for inductive spike suppression. These diodes are shown separately on the schematic diagrams but are actually wired inside the relays themselves.

Once the 1 minute timer has counted all the way down, it turns off the relay 130, which then disables the phone. It also turns on the LED 167 by applying a logical 1 to the input of a 74HC14 chip 166 whose output is connected to the LED's cathode. As mentioned above, the anode of the LED is connected to one side of a 1 K resistor 168, whose other side is connected to the output of 5 V regulator 104. Thus, a potential user can visually verify that the phone has been disconnected by the timer, rather than by an unrelated malfunction.

Looking at the use of the timer according to this invention, the above described set of switches 156 is provided to reset the unit and to select the total time, in 15 minute increments and up to a maximum of two hours, allowed for phone usage during any 24 hour period. These features could obviously be modified at will by one skilled in the art. Since each 24 hour period, and hence each new time allotment, begins with the resetting of the unit with switch 147, it is desirable that it be done late at night or early in the morning, so that each period tracks a normal day to the extent possible. Once the unit is set, it resets itself automatically after each 24 hour period. As one important feature of this invention, the setting of the switches can only be changed by opening the box 20 through the lock 34 of the secured lid 32. In the event that the user of the timer of this invention does not wish to allow any phone usage at all, he may do so by leaving all the switches, one through seven on switch bank 156, in the off position. In this setting the 2.2 K pull-up resistor 157 will hold node 191 high and will immediately start decrementing the one-minute timer. After one minute has passed, relay 130 will deenergize and the phone will become inoperable until the switch settings are changed. Thus, the timer will function as a locked telephone switch.

The electronic circuitry described above can be assembled in its entirety using components that are currently available commercially. On the other hand, those skilled in the art could easily design alternative circuitry to practice the invention. For example, the electronic circuitry could be designed to include a crystal oscillator to generate the timing signal for clocking purposes, thus enabling the apparatus to function from a battery power source alone, without the need for connection to a 110 VAC utility line. Similarly, the unit could be designed by one skilled in the art to draw power directly from the telephone line.

Thus, various changes in the details, steps and materials that have been described may be made by those skilled in the art within the principles and scope of the invention herein illustrated and defined in the appended claims. While the present invention has been shown and described herein in what is believed to be the most practical and preferred embodiment, it is recognized that departures can be made therefrom within the scope of the invention, which is therefore not to be limited to the details disclosed herein, but is to be accorded the full scope of the claims so as to embrace any and all equivalent apparatus and methods.

I claim:

1. An automatic timer for controlling the cumulative service time of a telephone within a predetermined period, comprising:

(a) a housing provided with two internal mounting slots for attachment to a telephone line outlet, said housing comprising a lid and lock for securely preventing unauthorized access to its interior;

(b) electrical means, contained in said housing, for connecting a telephone to said telephone line outlet, said means consisting of wiring attached to an internal plug for connection with said telephone line outlet and attached to an external outlet for connection with said telephone, and of a switch for line selection between the two alternative lines commonly wired into residential buildings;

(c) electronic means contained in said housing for clocking said predetermined period and said cumulative service time, comprising a power supply, a logic reset master switch, a 60 hertz timing source, an off-hook detector, a 24-hour time clock, and a cumulative service time clock; and electronic means for disconnecting said telephone at the expiration of said cumulative service time, comprising a one-minute time clock, driven by said cumulative service time clock, and a relay, driven by said one-minute time clock;

(d) mechanical means for resetting said electronic means and for selecting the length of said cumulative service time comprising a set of manually programmable control switches; and (e) a tone signal generator driven by said cumulative service time clock for alerting a telephone user of the impending disconnection of service at the end of said cumulative service time.

2. The automatic timer defined in claim 1, further comprising:

(f) a visual display to confirm the disconnection of service at the end of said cumulative service time.

3. The automatic timer defined in claim 1, wherein said power supply consists of battery backed electrical wiring for connection with a standard 110 VAC utility source.

4. The automatic timer defined in claim 1, wherein said power supply consists of a DC battery.

5. The automatic timer defined in claim 1, wherein said power supply consists of an electrical connection to the telephone line.

6. The automatic timer defined in claim 1, wherein said cumulative service time clock consists of 15-minute time clock.

7. A method for automatically controlling the cumulative service time of a telephone within a predetermined period, comprising the following steps:

(a) providing a housing with two internal mounting slots for attachment to a telephone line outlet, said housing comprising a lid and lock for securely preventing unauthorized access to its interior;

(b) providing electrical means, contained in said housing, for connecting a telephone to said telephone line outlet, said means consisting of wiring attached to an internal plug for connection with said telephone line outlet and to an external outlet for connection with said telephone, and of a switch for line selection between the two alternative lines commonly wired into residential buildings;

(c) providing electronic means contained in said housing for clocking said predetermined period and said cumulative service time, comprising a power supply, a logic reset master switch, a 60 hertz timing source, an off-hook detector, a 24-hour time clock, and a cumulative service time clock; and electronic means for disconnecting the telephone at the expiration of said cumulative service time, comprising a one-minute time clock, driven by said cumulative service time clock, and a relay, driven (d) providing mechanical means contained in said housing for resetting said electronic means and for selecting the length of said cumulative service time, comprising a set of manually programmable control switches;

(e) resetting said electronic means in said housing and selecting the length of said cumulative service time; and (f) preventing unauthorized access to the interior of said housing by securely locking said lid in place; and (g) providing means for alerting a telephone user of the impending disconnection of service at the end of said cumulative service time, comprising a tone signal generator driven by said cumulative service time clock.

8. The method defined in claim 7, further comprising the step of:

(h) providing a visual display to confirm the disconnection of service at the end of said cumulative service time.

* * * * *